106. COMPOSITIONS, COATING OR PLASTIC.

93

Patented June 10, 1930

1,762,267

UNITED STATES PATENT OFFICE

WILLIAM A. FRERET, OF WASHINGTON, DISTRICT OF COLUMBIA, ASSIGNOR TO NATIONAL LIME ASSOCIATION, OF WASHINGTON, DISTRICT OF COLUMBIA, A CORPORATION OF THE DISTRICT OF COLUMBIA

FILLER FOR BUILDING UNITS AND PROCESS OF PREPARATION

No Drawing.   Application filed August 22, 1923.   Serial No. 658,842.

This invention concerns itself with an improvement in building units and is designed to increase the desirable qualities of a brick or block in which lime is used as the cementitious material, and described in my patent application Serial No. 658,843, filed August 22, 1923.

In that application I have described a block in which lime is combined with an inert fibrous filler, such as wood or asbestos in its various forms, and in which the inert filler constitutes 20% of the mass.

I described in my prior application, one method of producing such a block, which was by moulding or casting. I have found by experimentation, however, that under certain circumstances, a block having less lime and more inert filler is highly desirable. I also found that if the inert filler were increased appreciably above 20% in a mixture which was of a sufficiently fluid consistency to be moulded or cast, that the filler, being more or less buoyant, floated to the top of the mixture which resulted in a block of uneven composition and texture. As a consequence of this circumstance, it was difficult to produce blocks having similar compressive lateral and tensile strength.

I also found, upon experimentation, that the fibrous filler tended to absorb the added water, with the result that the finished product either diminished in size, or in some cases even robbed the mixture of some of the water necessary to cause the hydration of the lime.

Where a building unit of the above type was desired and more than 20% of fibrous filler was used and the mass moulded or formed under pressure, the natural compressibility of the filter caused a compacting of the mass, and upon removal of, or diminishing the pressure, its inherent elasticity caused the mass to be disrupted or distorted.

With these imperfections of a block containing over 20% of fibrous filler in view, I have discovered that if the inert filler is coated with a material of a more or less rigid character, a proportion greater than 20% may be incorporated in the mass which will greatly increase the desirable qualities of the article.

I have discovered that if the ground or pulverized filler be thoroughly dampened, intimately mixed with ground gypsum and then spread in a place for twelve hours where thorough drying may take place, the gypsum forms a comparatively rigid and impenetrable coating upon the filler particles, with the result that when this coated filler is placed in the mass it neither absorbs water nor is compressible, that is to an undesirable degree. In place of gypsum, lime or cement may be used, in which case upon drying a coating of calcium hydrate or carbonate is formed, as the case may be, which also produces the desired result. It also appears, when this treated filler is introduced into the mass, that the added coating or shield increases the specific gravity of the particles to the extent that they do not tend to float to the top of the plastic or semi-fluid mixture, but remain homogeneously scattered throughout.

While at this time it has been found that either gypsum, lime or cement may be used satisfactorily to coat the individual particles of filler, yet I do not wish to be limited to these materials, as obviously any material which will become hard and substantially impervious to moisture may be satisfactory. It will be obvious that the particles of filler may be waterproofed by impregnation or coating with some water-proof fluid, and this will prevent shrinkage in the product due to absorption of the water from the mass, but this still leaves the filler capable of being compressed, which is detrimental. On the other hand the latter undesirable quality may be avoided by the use of a rigid coating which is not waterproof with the result that only a partial efficiency would be reached. It is, therefore, desirable that both the quality of rigidity and impenetrability to moisture, be present in the filler coating material.

By utilizing this coated filler I have produced structurally practical blocks from a mixture of 75% filler and 25% lime, by volume.

Having thus described my invention, what I claim is:—

1. A process of preparing building units which includes the steps of wetting a fibrous filler, mixing said wet filler with a dry cementitious material to form a coating thereon, allowing said coating to dry, incorporating said coated filler with a preponderance of lime and some water, forming this mass into a building unit and allowing said unit to dry.

2. A process of preparing building units which includes the steps of wetting a fibrous filler, mixing this wet filler with dry gypsum to form a coating thereon, allowing said coating to dry, incorporating said coated filler with a preponderance of lime and some water, forming this mass into a building unit, and allowing said unit to dry.

3. A process of preparing building units which includes the steps of wetting wood chips, mixing said wet chips with a dry cementitious material to form a coating thereon, allowing said coating to dry, incorporating said coated filler with a preponderance of lime, and some water, forming this mass while under pressure into a building unit, and allowing said unit to dry.

4. A building unit composed of lime as the binding agent and containing a fibrous filler having an independent coating of cementitious material.

5. A building unit composed of a preponderance of lime as the binding agent and containing wood chips having an independent coating of gypsum.

6. A building unit composed of a preponderance of lime as the binding agent and containing at least 20% of wood chips having an independent coating of gypsum.

7. A building unit composed of substantially 80% lime, and substantially 20% wood chips having a gypsum coating.

8. A process of preparing a filler material for construction units comprising wetting ligneous substances, applying to the wetted surface a substantially dry calcareous compound to form a coat thereover, and allowing said coat to dry thereon.

9. A process of preparing a filler material for construction units comprising wetting a fibrous substance, applying to the wetted surface discrete gypsum to form a coat over the surface of the fibrous substance, and permitting the coat to dry.

10. A filler material for building blocks comprising particles having a ligneous core and a matrix of gypsum.

11. The process of preparing sawdust and the like to mix with Portland cement which consists in mixing said sawdust with a coating matter which hardens and which is capable of mixing with cement, said coating matter being thoroughly mixed with the sawdust so as to coat each particle of sawdust without changing its inner condition and constituting an addition thereto whereby to cause said coated particle of sawdust to mix with cement when said coated sawdust is used as a substitute for sand.

12. The process of making sawdust and the like usable with Portland cement as a substitute for sand which consists in coating each particle of sawdust by a mixing and stirring action with a coating matter which covers said sawdust particles and hardens as an encasing shell which matter when hard will form a bond with Portland cement and constitutes a substitute for sand.

In testimony whereof I affix my signature.

WILLIAM A. FRERET.